April 6, 1937.   R. B. HEARN   2,075,897
SIGNAL DISTORTION INDICATING AND MEASURING DEVICE
Filed June 23, 1933
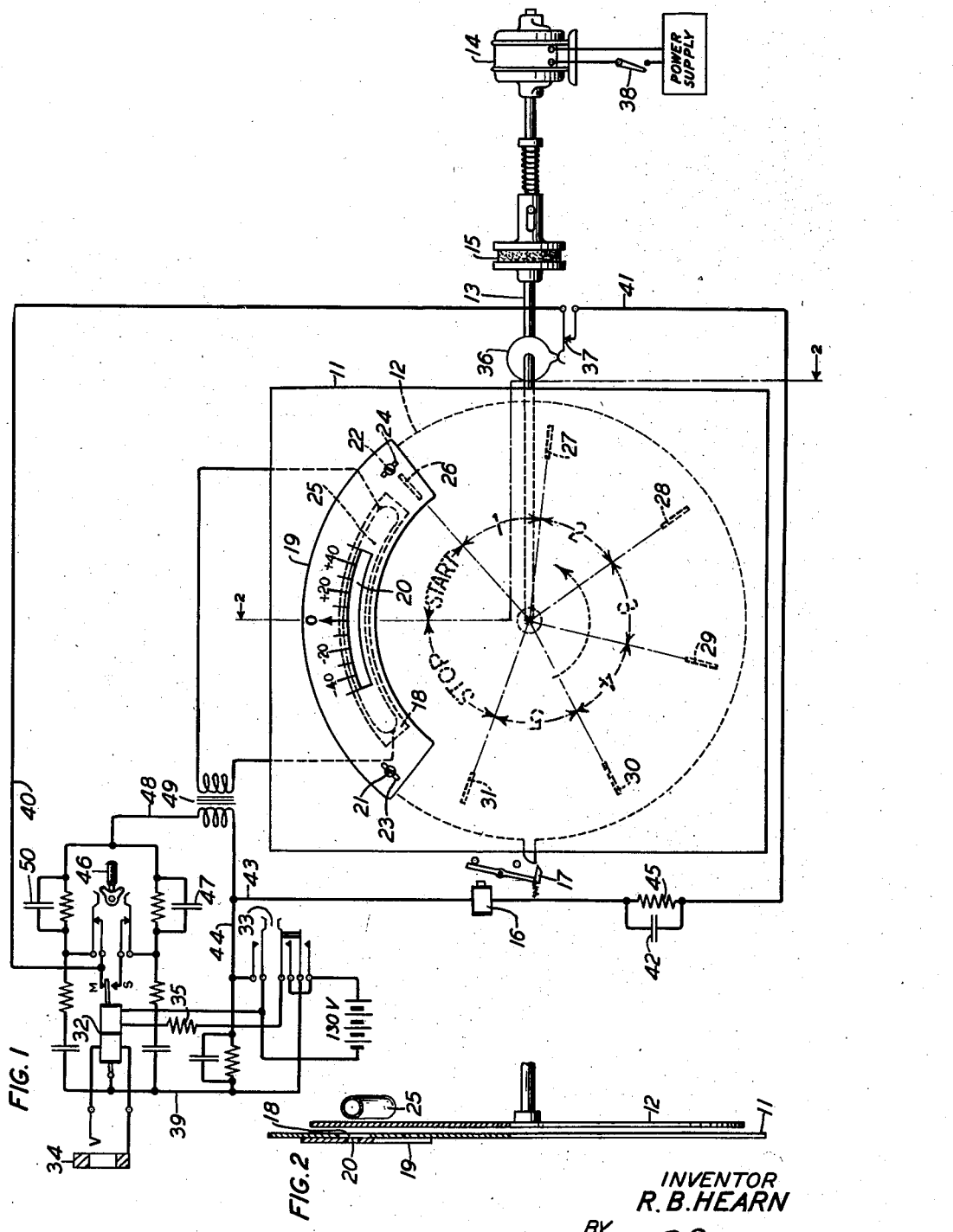
INVENTOR
R.B.HEARN
BY
*J. W. Schmied*
ATTORNEY Patented Apr. 6, 1937

2,075,897

UNITED STATES PATENT OFFICE 2,075,897

SIGNAL DISTORTION INDICATING AND MEASURING DEVICE

Richard B. Hearn, Brooklyn, N. Y., assignor to Bell Telephone Laboratories, Incorporated, New York, N. Y., a corporation of New York Application June 23, 1933, Serial No. 677,204

9 Claims. (Cl. 178—69)

This invention relates to telegraph apparatus and more particularly to apparatus for measuring signal distortion in a telegraph system.

One of its objects is to give a visible indication of the extent of the distortion at either end of each signal impulse.

This object, more specifically stated, is to obtain an indication of the maximum displacement of either end of each received signal impulse.

Heretofore in arrangements for measuring distortion in telegraph circuits in order to determine such measurements, it has been necessary first, to discontinue service on the circuit while measurements were being taken, secondly, to transmit a special or known signal for the purpose of obtaining the measurements, and thirdly, to estimate the amount of displacement at either end of the signal impulse, because the results obtained were in terms of the maximum and minimum lengths of the marking and spacing elements, or impulses, of the signals. The maximum displacement of either end of a signal element is of more importance than the total length of the element.

A feature of the present invention is an arrangement whereby the amount of distortion at either end of a signal impulse may be readily determined, for example, a signal element lengthened 20% may be determined to be of any of the following conditions:

1. The impulse may be distorted equally on each end by a positive amount. The distortion is therefore only 10%.

2. The impulse may be undistorted at one end and 20% distorted on the other end.

3. The impulse may be distorted by a negative amount on one end and by a positive amount at the other end. The distortion on the one end would therefore be plus 20% plus an amount equal to the negative amount on the other end.

According to the present invention the distortion indicator comprises a disc rotatable in a manner similar to that of the brush arm of a start-stop distributor. The disc is divided into seven sectors corresponding to the seven units of the start-stop telegraph code. Between adjacent sectors and at a point near the periphery of the disc is a short slot. These slots are radially positioned and are arranged concentrically with the center of rotation of the disc. The slot between the first and the last sector is omitted as will be hereinafter described. The distances between slots, except, of course, that between the first and the last, are equal. The angular length of the sector immediately preceding the first slot is slightly less than the distance between the other slots because of the inertia of the disc at the start of each revolution and the angular length of the sector immediately following the last slot is slightly greater than the distance between the other slots. In other words, the sum of the angular lengths of the first and the last sectors is twice the distance between the adjacent slots. The distance that the slots are from the center of the disc is so selected that the angular distance between slots is equal in time relation to the duration of a unit length impulse of the five unit code. The disc is arranged to rotate in approximate synchronism with, that is, slightly faster than, the transmitting distributor at the sending end of the line. Immediately to the rear of the disc and located directly in line with the path of rotation of the slots is a glow-discharge tube arranged to momentarily operate at each change of polarity in the incoming signals. A stationary reference point is provided and should there be no distortion in the incoming signals the glow-discharge tube will operate at the time a slot is directly in line with the reference point. Should the tube discharge at the moment the slot is on either side of the reference point, the distance between the slot and the reference point will be the amount of distortion in the incoming impulse.

The total length of a signal impulse which may appear to be undistorted by the older method of measurement because it is shortened at one end and lengthened an equal amount at the other end is disregarded, but the displacement of either end of an impulse is accurately measured. The circuit arrangement comprises a three-positioned key which, in its normal postion, controls a circuit for indicating and measuring the distortion at the end of each impulse, in one operated position, controls the circuit for indicating and measuring distortion at the end of a marking impulse, or at the beginning of a spacing impulse, and in the other operated position, controls the same circuit for indicating and measuring the distortion at the beginning of a marking impulse, or the end of a spacing impulse. The limiting condition for circuits where the applicant's invention may be used, is reached when the signal impulses are distorted 50% or more. At this point signal impulses may overlap and it would be impossible to determine whether one impulse was distorted plus 50% or the next impulse was distorted minus 50%. The applicant's measuring set may be connected to any line in a printing telegraph system without interrupting service on the line.

The invention may be clearly understood from the following description when read in connection with the accompanying drawing of which:

Fig. 1 shows a preferred embodiment of the present invention comprising the indicating device and the associated circuit arrangement in schematic form, and Fig. 2 shows an elevation view of the indicating device taken along section line 2—2 of Fig. 1.

Referring to Fig. 1 a fixed mask 11 serves as a front cover of the distortion indicating unit. It may be of any suitable opaque material and preferably of the shape shown. At the rear of the mask 11 is positioned a rotatable disc 12 fixedly mounted on shaft 13. The disc 12 is arranged to rotate intermittently in a manner similar to a start-stop rotary distributor of the type used in start-stop printing telegraph systems. It is driven by a motor 14 through friction clutch 15 and is controlled by start magnet 16 through the latching member 17. Motor 14 operates the disc in synchronism with the distributors of telegraph systems to be tested. Across the top of mask 11 is an arcuate slot 18 cut concentrically with the axis of rotation of disc 12. Adjustably mounted on the front of mask 11 is a calibrated scale member 19 having a slot 20 also disposed concentrically with the axis of rotation of disc 12. Scale member 19 is attached to mask 11 by means of screws 21 and 22 which are adjustably fitted into slots 23 and 24 so that the scale member 19 may be oriented a slight distance in either direction. Arcuate slot 20 is equal in length to a unit impulse of a five-unit code and is arranged to be normally positioned directly in front of and approximately in the center of slot 18. The scale member 19 is calibrated to indicate on either side of the zero, or middle, reference point of slot 20 the exact amount of distortion present in an incoming signal impulse up to and including 40% of a unit length impulse of the transmitted signal. A tubular neon lamp 25 made to conform to the arcuate slot 18, is mounted directly to the rear of slot 18. Other types of lamps having a trigger glow effect of almost negligibly short duration such as a mercury vapor tube, may be used in place of the neon gas lamp.

The rotatable disc 12 is divided into seven angular sections respectively corresponding to the "start" segment, the five selecting segments Nos. 1 to 5 inclusive, and the "stop" segment usually provided on the start-stop rotary distributor used in printing telegraphy. These angular sections are measured along the circumference traced by the radius of the center of slots 18 and 20. The "start" section plus the time to overcome inertia and each of sections Nos. 1 to 5 are equal in time relation to the duration of a unit length impulse of the five-unit code, and the "stop" section must be in time relation less than one and a half times the duration of the unit length impulse. Located at the points of division between sections and along the circumference traced by the radius of the center of slots 18 and 20 are a series of short radial slots 26 to 31 arranged as shown, one slot being provided for each point of division except that between the "start" and the "stop" sections. Normally, that is, when the rotatable disc 12 is at rest, the point between the "start" and the "stop" sections coincides with the zero reference line on the calibrated member 19. No slot is provided at the point of division between the "start" and the "stop" sections. The reason for this is that the rotatable disc 12, as will be hereinafter described, does not start rotating until the start magnet 16 releases after the opening of a "break" contact of line relay 32 and the neon lamp 25 flashes when a "make" contact of the relay is closed. As the travel time of the relay armature is less than the release time of the magnet, it is obvious that should a slot be placed between the "start" and the "stop" sections the flash caused by the closing of a "make" contact, in response to the first impulse of a signal combination, would occur at the zero reference line, regardless of how imperfect the received impulse may be, and therefore the indication on the first, or spacing, impulse would always be at the zero reference line.

The line relay 32 is of the two-position polar type which is normally polarized by a biasing current flowing through its right winding to hold its armature, when no signal impulses are being received from the line, in engagement with its upper, or marking, contact as shown, the biasing circuit being completed through the middle contact of battery switch 33 in an operated position. The operating, or left, winding of relay 32 is connected to a two-wire spring jack 34 which may be mounted in a monitor desk of some suitable type wherein by means of a patching cord (not shown) the distortion indicating and measuring circuit may be connected to any one of a plurality of subscribers' and/or trunk lines. By means of resistance 35 the biasing current flowing through the right winding of relay 32 may be adjusted to be about one-half of the line current which flows through the operating, or left, winding of the relay, so that when signal current is on the line the signaling current received in the left winding will predominate. The distortion of polar signals may be also measured by opening the biasing circuit connected to the right winding of the relay 32.

The spring jack 34 may be also connected by means of a patching cord to some suitable form of transmitter whereby undistorted signals may be transmitted directly to the distortion indicating and measuring device for the purpose of adjusting the calibrated member 19 before tests are made on transmission lines.

*Operation of the system*

The remaining apparatus employed in the present invention will be satisfactorily described in connection with the operation of the system which is as follows:

When it is desired to measure the distortion of signals on some particular circuit terminating at an office in a printing telegraph exchange system or elsewhere, the jack 34 is connected by means of a patching, or interconnecting, cord to a jack connected into the particular line. Then the motor start switch 38 is operated to its closed position to start motor 14. Next, the battery switch 33 is operated to its alternate position whereby the positive pole of the 130-volt battery is connected at the lowermost operated contact of the switch to a circuit extending over conductor 39, armature and marking, or upper, contact of relay 32, conductor 40, closed contacts 37, conductor 41, shunted condenser 42, through the winding of start magnet 16, conductors 43 and 44, uppermost operated contact of switch 33 to the negative pole of the 130-volt battery. The surge of current that flows through the circuit just traced, in response to the closing of contacts 37 immediately following the operation of switch 33, is of sufficient value to cause the operation of magnet 16. Magnet 16 in operating, locks up disc 12 through the latching member 17. The resistance element 45 which shunts condenser 42, is of such value as to allow sufficient current to flow through the operating circuit for magnet 16 to maintain the latch in an operated position during the time that the upper contacts of relay 32 remain closed prior to the reception of line signals.

As stated above, the five-unit code as used in start-stop systems, comprises a "start", or spacing, impulse, five selecting impulses which may be spacing or marking depending on which of the signal combinations available in the code is being transmitted, and a "stop", or marking, impulse. Upon the receipt of the "start" impulse, the relay armature breaks away from the marking, or upper, contact to open the holding circuit for magnet 16. Magnet 16 deenergizes to cause its associated latching member 17 to release the rotatable disc 12. The rotatable disc immediately begins to rotate under the influence of friction clutch 15. When the armature of the relay passes into engagement with its spacing, or lower, contact, a circuit is closed extending from the positive pole of the battery connected to the lowermost operated contact of switch 33, armature and lower contact of relay 32, lower closed contacts of key 46, shunted condenser 47, conductor 48, primary winding of transformer 49, conductor 44, uppermost operated contact of switch 33 to the negative pole of the battery. Disc 12 and cam 36 will rotate through a sufficient arc to open contacts 37 so that the operating circuit for magnet 16 can not be closed until the disc 12 has rotated through a complete revolution before the armature of relay 32 again makes on the upper contact. A high surge of current is produced in the circuit closed at the spacing contact of relay 32 which in turn produces a high surge of voltage in the secondary winding of transformer 49 which is connected in a "dead" circuit including the neon lamp 25. Lamp 25 flashes in response to the high voltage surge, but inasmuch as there is no slot between the "start" and the "stop" sections of the disc 12, as hereinbefore described, the position of the disc at the time the flash occurs is not indicated or measured.

Assuming that the next, or first, impulse of the selecting group received in the operating winding of relay 32, is marking, or as commonly referred to in the art as a mark, the armature of the relay will, in response to such impulse, operate to the marking, or upper, contact. A circuit is thus closed which may be traced from the positive pole of the battery, conductor 39, armature and upper contact of relay 32, upper closed contact of key 46, shunted condenser 50, conductor 48, primary winding of transformer 49, upper operated contact of key 33, to negative pole of the battery. A high current surge produced in the circuit just traced causes to be induced in the secondary winding of transformer 49 a high voltage surge in the lamp circuit whereby a flash occurs about the time slot 26 reaches the zero reference line on the calibrating member 19. The distance this flash appears to occur on either side of the zero reference line is indicated by the graduation along slot 20 so that the percentage of positive or negative distortion of the first selected impulse may be readily determined. Each of the succeeding impulses of the selecting group, which effect a change in polarity of the incoming signals, will cause to be induced in the secondary winding of transformer 49 a voltage surge whereby the lamp 25 is caused to flash at a time when the particular slot of those designated 27, 28, 29 and 30, which corresponds to the impulse, in question, is passing near the zero reference line. The distance of the slot on either side of the zero line at the time the flash occurs determines the percentage of distortion of the particular impulse. The last, or "stop", impulse of a signal combination is, as stated above, always a mark, and therefore, should the last selecting impulse be of positive polarity a flash will occur in the lamp circuit at a time when the slot 31 is passing near the zero line. In this way the distortion of each of the selecting impulses that effect the change in polarity in the incoming signals may be observed accurately.

At the end of each incoming signal combination the disc 12 has made a complete revolution and cam 36 has been brought into the position shown whereby the contacts 37 are closed. Should an incoming signal combination be followed by an interval wherein no signals are received the magnet 16 will remain energized and the disc 12 is therefore maintained in a locked position. However, as soon as a new signal arrives, magnet 16 is deenergized by the first, or space, impulse of the new signal and the disc 12 is again allowed to make another complete revolution as is well known in the art. It may be desired to determine the distortion at the beginning and/or ending of either the space or the mark impulse. In this event a three-position key 46 is employed. For example, should it be desired to determine the distortion of the beginning of space impulses only, key 46 would be operated to and locked in an upward position so that the upper contact of the key switch would be opened. In like manner should it be desired to determine the distortion of the beginning of the mark impulses only, the key 46 would be operated to and locked in a downward position so that the lower contacts would be opened.

What is claimed is:

1. The method of measuring at the receiving end of a transmission circuit the distortion of signal combinations composed of signal impulses of definite lengths which consists in rotating in synchronism with the incoming signal impulses a disk having a plurality of radially positioned sighting elements spaced in time relation in accordance with the length and sequence of the impulses of said signal combinations, impressing at the beginning and ending of each signal impulse a voltage across the terminals of an inertialess device to momentarily illuminate certain of said elements, in turn, and determining with respect to a fixed point the position of each illuminated element, in turn, to indicate the amount of distortion present in the corresponding signal impulses.

2. The method of measuring at the receiving end of a transmission circuit the distortion of signal combinations of a start-stop signaling code, composed of signal impulses of definite length, which consists in intermittently rotating a disk having a plurality of radially positioned slots spaced in time relation in accordance with the length and sequence of the impulses of said signal combinations, impressing at the beginning and ending of each signal impulse a voltage across the electrodes of a gaseous discharge tube in a common path to momentarily illuminate any one of said slots, and determining with respect to a fixed point the position of each illuminated slot to indicate the amount of distortion present in each signal impulse.

3. In combination, a source of signal impulses, a transmission circuit over which said signal impulses are received, a voltage source responsive to changes in the direction of current in the signal impulses, a stationary gaseous discharge tube having electrodes upon which the voltage from said source is impressed to cause said discharge tube to flash, and a disk having a plurality of radially positioned sighting elements spaced in time relation in accordance with the length and sequence of said signal impulses and rotatable at such speed that one of said sighting elements is illuminated by said discharge tube at each change in direction of current in the signal impulses.

4. In combination, a source of signal impulses, a transmission circuit over which said signal impulses are received, a voltage source responsive to changes in the direction of current in the signal impulses, a stationary gaseous discharge tube having electrodes upon which the voltage from said voltage source is impressed to cause a flash therein, a disk having a plurality of radially positioned slots spaced in time relation in accordance with the length and sequence of said signal impulses and rotatable at such speed that one of said slots is illuminated by said discharge tube at each change in direction of current in the signal impulses, and a stationary member having an arcuate slot equal in length to a unit length impulse and positioned in the path of the slots in said rotatable disk whereby the position of said illuminated slots with respect to a fixed reference point on said stationary member indicates the amount of distortion present in the corresponding signal impulse.

5. In combination, a source of signal impulses of the start-stop code, a transmission circuit, a voltage source responsive to changes in the direction of current at the beginning and ending of each signal impulse, a gaseous discharge tube having electrodes upon which the voltage from said voltage source is impressed to cause a flash therein, a disk having a plurality of radially positioned slots spaced in time relation in accordance with the length and sequence of said signal impulses and rotatable at such speed that one of said slots is illuminated by the flash of said discharge tube at each change in direction of current in the signal impulses, a stationary member having an arcuate slot equal in length to a unit length impulse and positioned adjacent to the path of the slots in said rotatable disk whereby the position of any one of said illuminated slots with respect to a fixed reference point on said stationary member indicates the amount of distortion present in the corresponding signal impulse and switching means arranged when in one position to operate said discharge tube to indicate the distortion at the beginning and ending of each signal impulse, in another position, to indicate the distortion at the beginning of each signal impulse, and in still another position, to indicate the distortion at the ending of each signal impulse.

6. In a system for measuring the distortion of the signal combinations of a start-stop signaling code, an intermittently rotatable member provided with radially aligned slots corresponding in number to pulses received in each signal combination and spaced in accordance with the lengths of the successive pulses constituting each of said signaling combinations, means for moving said member during the reception of each of said signaling combinations at a velocity such that each of said slots reaches a fixed reference line or point in synchronism with the beginning or ending of the corresponding point of the undistorted received signaling combinations, and a single light source for instantaneously disclosing the position of said slots with respect to said reference point at the instant of beginning or ending of some of the pulses in the received signal combinations.

7. A signal distortion indicator comprising a relay responsive to periodic signal impulses of marking and spacing character, a neon lamp responsive to changes from spacing to marking and/or from marking to spacing signal impulses, a repeating apparatus having an intermittently rotative movement and controlled by said relay for momentarily operating said lamp in response to the changes in the character of said signal impulses, continuously operated driving mechanism for said receiving apparatus, a rotary member driven by said driving mechanism at a definite speed relation to the operating speed of said receiving apparatus and provided with radially aligned slots corresponding in number to the signal pulses receiving during one revolution of said member, circuit means controlled by changes in the character of said signal pulses for causing said lamp to momentarily illuminate one of said slots at the instant the character of said signal changes, and switching means for selecting at will the changes in character of the signals selected at the beginning of spacing impulses or the beginning of marking impulses.

8. A signal distortion indicator for a telegraph system comprising a relay responsive to periodic signal impulses of marking and spacing character of a start-stop code, a gaseous conduction lamp, a stroboscopic scanning disk provided with slots adapted to register successively with a datum line when passing in front of said lamp, a continuously operating motor for rotating said disk in substantial synchronism with the signal impulses, start-stop means controlled by said relay for releasing said disk, and means controlled by said relay for momentarily flashing said lamp at the beginning and ending of each of said received signal impulses.

9. In a signal distortion indicator for a telegraph system, the combination with a source of uniform code character signals composed of marking and spacing impulses, of a gaseous conduction lamp, a rotary scanning device frictionally driven from a constant speed motor and having sighting elements for observing flashes from said lamp, said elements being so disposed that they successively pass in front of the lamp at intervals corresponding with the impulses of the code characters, a stop device operating to arrest said disk after each revolution, means controlled by a signal impulse to withdraw said stop device, and means arranged to be manually operated to any one of three positions depending upon whether the flashing of said tube is desired at both changes from the marking and spacing and the spacing to marking, or at changes from the marking to spacing, or at changes from the spacing to marking characteristics of the signals.

RICHARD B. HEARN.